United States Patent [19]

Hilber

[11] 4,171,731
[45] Oct. 23, 1979

[54] PROTECTIVE MOUNTING OF COMPONENTS OF LAND VEHICLES, SUCH AS MOTORCYCLES

[75] Inventor: Johann Hilber, Hochberg, Fed. Rep. of Germany

[73] Assignee: Kreidler Werke GmbH, Fed. Rep. of Germany

[21] Appl. No.: 831,003

[22] Filed: Sep. 6, 1977

[30] Foreign Application Priority Data

Sep. 16, 1976 [DE] Fed. Rep. of Germany ....... 2641586

[51] Int. Cl.² ...................... B62D 61/02; B60R 11/06
[52] U.S. Cl. ...................... 180/219; 49/386; 180/225; 224/31; 280/289 R; 297/193; 297/195
[58] Field of Search ............... 180/30, 35; 280/289 R; 297/193, 195; 49/386; 224/31

[56] References Cited

U.S. PATENT DOCUMENTS

| | | | |
|---|---|---|---|
| 653,105 | 7/1900 | MacLeay | 297/193 |
| 1,832,642 | 11/1931 | Leff | 297/193 |
| 3,372,768 | 3/1968 | Wresch | 180/34 |
| 3,432,967 | 3/1969 | Simon | 49/386 X |
| 3,513,926 | 5/1970 | Paget | 180/32 |
| 3,779,597 | 12/1973 | Uchida | 297/195 X |
| 3,927,727 | 12/1975 | Hanagan | 180/30 |

FOREIGN PATENT DOCUMENTS

708586 5/1954 United Kingdom ...................... 180/35

*Primary Examiner*—John P. Silverstrim
*Attorney, Agent, or Firm*—Steinberg & Blake

[57] ABSTRACT

A land vehicle such as a motorcycle has a frame and seat which, when the seat is in a normal operating position, define between themselves a space which is substantially closed and substantially inaccessible. A structure which includes components such as electronic components is situated in this latter space so as to be protected from the outer atmosphere and from unauthorized access when the seat is in its normal operating position. By way of a suitable connecting structure the seat can be displaced from its normal operating position to a location where the seat is at least partially spaced from the frame to give access to the space where the structure which includes electronic components or the like is situated, so that access may be had to the structure for servicing or the like.

4 Claims, 6 Drawing Figures

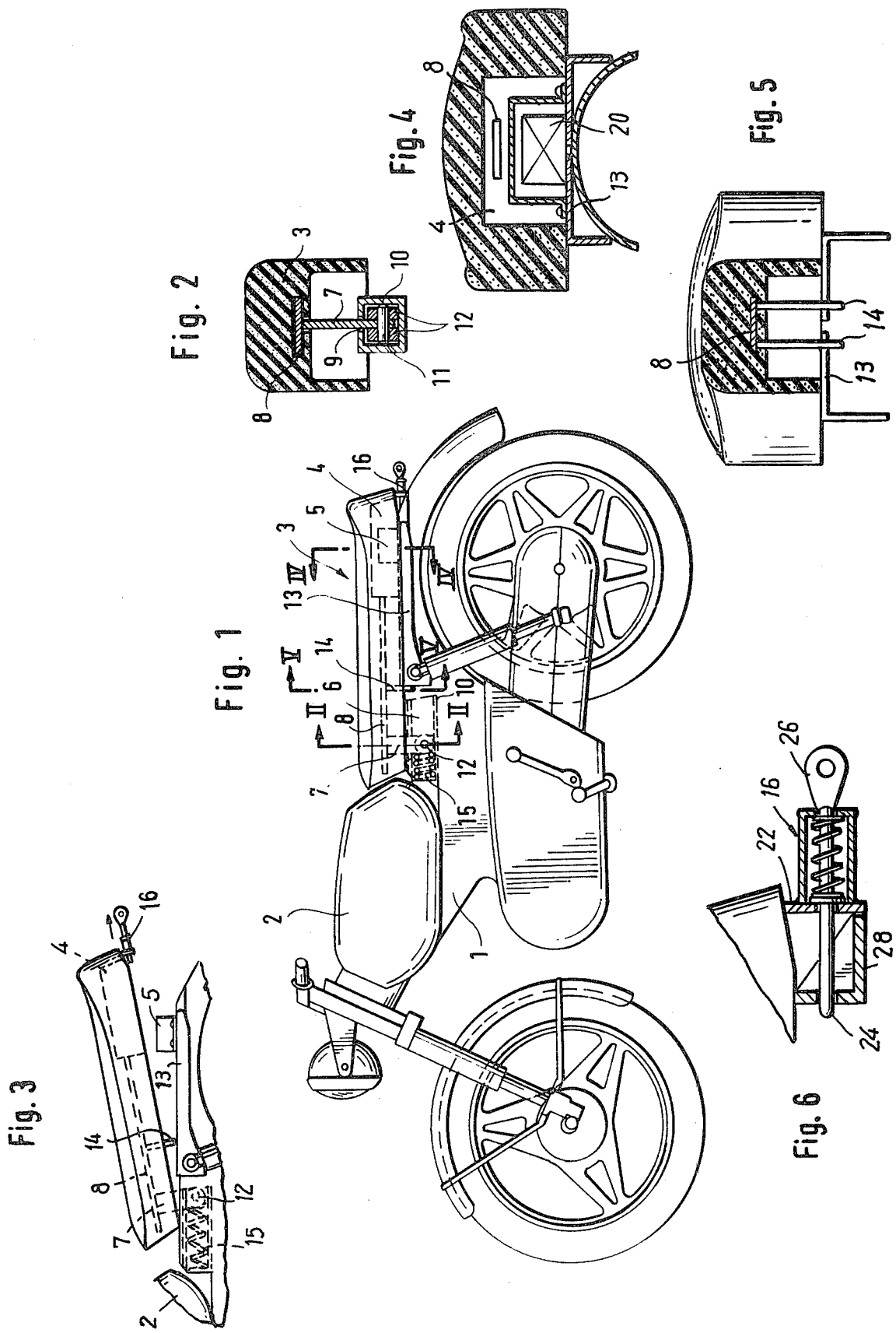

PROTECTIVE MOUNTING OF COMPONENTS OF LAND VEHICLES, SUCH AS MOTORCYCLES

BACKGROUND OF THE INVENTION

The present invention relates to land vehicles such as motorcycles which have a seat which is straddled by the operator and which is situated over the frame of the vehicle.

Such vehicles are required to include relatively delicate structure made up, for example, of components such as switches for measuring, controlling and warning devices of the vehicle, this switch structure including electronic components such as transistors, capacitors, and the like, which should be protected from the outer atmosphere and from unauthorized access.

The vehicle of the invention is of the type which has a seat situated directly behind a fuel tank on the frame of the vehicle with the seat being pivotally connected to the frame.

In order to improve the safety and operating characteristics of vehicles such as motorcycles, such vehicles are to an increasing extent provided with electronic devices for purposes such as measuring, controlling, and giving warning signals. The electronic components of such a structure will operate in a trouble-free manner only when they are protected against dirt or other foreign matter, the effects of moisture, and unusually cold or hot temperatures, as well as against mechanical damage.

SUMMARY OF THE INVENTION

It is accordingly a primary object of the present invention to provide a construction which will meet the above requirements by rendering it possible to mount on a vehicle such as a motorcycle a structure such as electronic components in such a way that this structure will have an assured trouble-free operation.

Thus, it is an object of the present invention to provide a construction according to which it becomes possible to mount a structure of the above type on a land vehicle of the above type in such a way that the structure is protected against mechanical damage, soiling, contact with foreign bodies, and undesirable atmospheric conditions.

At the same time, it is an object of the present invention to provide a structure according to which it becomes possible when desired to have easy convenient access to the above structure so that whenever necessary it is possible to service this structure without any difficulty.

According to the invention the land vehicle which includes a frame means and a seat means which is to be straddled by the operator and which is situated over the frame means, have the latter pair of means constructed in such a way that they define between themselves a space which is substantially closed and substantially inaccessible when the seat means is in its normal operating position. However, a connecting means connects the seat means to the frame means for movement with respect thereto away from the normal operating position to a location where the seat means is at least partially spaced from the frame means to give access to the space which is defined between the frame and seat means when the latter is in its normal operating position. A structure which includes electronic components, for example, is situated in this space and is carried by at least one of the pair of means formed by the seat means and frame means. Thus, by way of this construction when the seat means is in its normal operating position the structure which includes electronic components or the like is protected against atmospheric effects and against unauthorized access, while when the seat means is displaced to the above location easy access may be had to the electronic components or the like for servicing the same as required.

BRIEF DESCRIPTION OF DRAWINGS

The invention is illustrated by way of example in the accompanying drawings which form part of this application and in which:

FIG. 1 is a schematic side elevation of a land vehicle which includes the structure of the invention;

FIG. 2 is a schematic transverse section taken along line II—II of FIG. 1 and illustrating details of the connection between a seat means and frame means of the invention;

FIG. 3 is a schematic illustration of part of the structure of FIG. 1 in the position taken thereby when the seat means has been at least partially displaced away from its normal operating position;

FIG. 4 is a schematic transverse section of part of the structure of FIG. 1 taken along line IV—IV of FIG. 1 in the direction of the arrows;

FIG. 5 is a transverse section of part of the structure of FIG. 1 taken along line V—V of FIG. 1 in the direction of the arrows; and FIG. 6 is a fragmentary schematic partly sectional elevation showing the detail of a structure for releasably locking the seat means in its normal operating position.

DESCRIPTION OF A PREFERRED EMBODIMENT

Referring to FIG. 1, it will be seen that the vehicle illustrated therein is a motorcycle type of land vehicle which includes a frame means 1 which carries at an upper front portion thereof, just behind the handle bars, a fuel tank 2. Situated over the frame means 1 directly behind the fuel tank 2 is a seat means 3. According to the features of the present invention this seat means 3 is formed at a lower rear portion thereof with a recess 4 which is substantially U-shaped in transverse cross section and which is open at its bottom. When the seat means 3 is in its normal operating position shown in FIG. 1, the recess 4 is closed by the frame means 1 so that the latter together with the seat means form a pair of means which define between themselves the space which is formed by the recess 4 at the lower rear portion of the seat means 3. A housing 5 is fixed to the frame means 1 within the recess 4, when the seat means 3 is in its normal operating position, and this housing 5 accommodates in its interior a structure such as electronic switch elements or other electronic components 20, schematically illustrated in FIG. 4, which are operatively connected to certain parts of the vehicle for providing measurement, controls, and warning signals.

A connecting means connects the seat means 3 to the frame means 1 for movement with respect thereto from the normal operating position illustrated in FIG. 1 to a location where the seat means 3 is at least partially spaced from the frame means 1 so as to give free access to the structure which includes the housing 5 and the components 20. This connecting means includes an elongated guide means 6 which is carried by the frame means and extends rearwardly from the tank 2 beneath the front end region of the seat means 3 when the latter is in its normal operating position shown in FIG. 1. A pivot means is directly connected to the seat means 3 to enable the latter to be turned about an axis which extends transversely of the vehicle, and this pivot means is guided by the guide means 6 for longitudinal movement along the vehicle rearwardly away from and forwardly toward the tank 2.

This latter structure includes an elongated bar 8 which is anchored in the padding or cushioning material of the seat means 3, this bar 8 having welded thereto a bar 7 which extends downwardly from the bar 8 to an elevation beneath the seat means 3. The guide means 6 includes the elongated tubular guide 10 which is of rectangular cross section and which is fixed to the frame means 1 while having at its upper wall a longitudinal slot 9 through which the bar 7 freely extends so as to be movable along the slot 9. This bar 7 carries at its lower end region which is situated within the hollow guide 10 a pair of rollers 12 which are supported on a pin 11 which is carried by the bar 7 and which extends transversely with respect thereto so that the rollers 12 are respectively situated on opposite sides of the bar 7, as shown in FIG. 2. These rollers 12 are capable of rolling along the upper surface of the lower wall of the guide tube 10 in the interior thereof. Between the rollers 12 and the top wall of the tube 10, which is formed with a slot 9, there is a considerable clearance. The structure is designed only so that the rollers 12 will be reliably maintained in the interior of the guide tube 10 so as to prevent separation of the seat means 3 from the frame 1, particularly in an upward direction.

The rear portion of the seat means 3 rests on angle irons 13 of the frame means 1 when the seat means 3 is in its normal operating position shown in FIG. 1. The engagement between the seat means 3 and angle irons 13 is also illustrated in FIG. 4.

The plate or bar 8 has fixedly connected thereto a pair of rigid fingers 14 which extend downwardly from the bar 8 slightly beyond the lower surface of the seat means 3, these fingers 14 forming part of a releasable holding means for releasably holding the seat means 3 in its normal operating position. A spring means 15 urges the seat means 3 rearwardly away from the fuel tank 2, and in the normal operating position of the seat means 3 which is shown in FIG. 1 the lower free end portions of the fingers 14 are pressed by the spring means 15 against the front edges of the angle irons 13 of the frame means 1, so that the engagement of the fingers 14 with the front ends of the angle irons 13 prevent the rearward displacement of the seat means 3 by the spring means 15. This spring means 15 may conveniently be located in the interior of the guide tube 10 engaging a front end wall which closes the guide tube 10, while also engaging the front edge of the bar 7. This front edge of the bar 7 extends forwardly slightly beyond the rollers 12 so that the spring 15 does not engage the rollers 12. The spring 15 is of course a coil spring which is compressed when in the position shown in FIG. 1.

In addition, the seat means 3 fixedly carries at its rear a downwardly extending bracket 22 (FIG. 6) which carries a spring-pressed lock member 24 forming part of a releasable lock means 16. The frame means 1 fixedly carries at its rear portion an upwardly extending wall 28 formed with an opening through which the spring-pressed pin of the lock means 16 extends in the normal operating position of the seat means 3. The pin 24 carries at its rear end an eye 26 which can be grasped by the operator to pull the pin 24 rearwardly in opposition to the spring which urges this pin 24 forwardly, and thus the pin 24 can be pulled rearwardly beyond the plate 28 to release the seat means 3 for upward turning movement about the axis defined by the pin 11 which carries the rollers 12. Thus, the releasable lock means 16 prevents upward turning of the seat means 3 from its normal operating position. Of course when the lock means 16 holds the seat means 3 in its normal operating position the lower surface of the seat means 3 engages the upper surface of the angle irons 13 of the frame means 1.

It is thus apparent that with the above-described structure of the invention as long as the seat means 3 remains in its normal operating position the structure which includes the housing 5 and the components 20 therein is closed off from the outer atmosphere and protected against unauthorized access. When the components within the housing 5 are to be examined or repaired, the releasable lock means 16 is manipulated so as to release the seat means 3 for upward turning movement away from its normal operating position. When the pin 24 of the lock means 16 has been pulled rearwardly away from the member 26, the seat means 3 is turned up through a relatively slight distance sufficient to locate the bottom ends of the pins 14 above the front edges of the angle irons 13, and at this time the spring means 15 can expand to displace the seat means 3 rearwardly away from the tank 2 while the bottom ends of the pin 14 can slide along the upper surfaces of the angle irons 13, as indicated in FIG. 3. Thus, the rearward movement of the seat means 3 will prevent any interference by the fuel tank 2 with the upward turning of the seat means 3. At the same time the spring means 15 can serve to place the structure in the condition schematically in FIG. 3 where the seat means 3 may be situated at a location suitable for providing adequate access to the housing 5. If not it is a simple matter to turn the seat means 3 further upwardly beyond the position thereof shown in FIG. 3. When the servicing or examining operations are completed and the housing 5 is returned to its position enclosing the components 20, it is only necessary to push the seat means 3 forwardly until the pins 14 can be turned downwardly in front of the front edges of the angle irons 13 and the lock means 16 is then manipulated to lock the seat means 3 in its normal operating position.

It is thus apparent that with the invention the electronic components or the like are situated between the seat means 3 and the frame means 1 in a hollow space defined by this pair of means, and in this space the housing 5 and components 20 are protected against unauthorized access as well as against environmental influences, while at the same time being rendered easily and conveniently accessible as required.

Furthermore, these components 20, in the form of electronic switch elements or the like, can be assembled together into a compact unit which is situated within the housing 5 so that this manner of assembling all of these delicate components in a single unitary assembly at one location within the housing 5 provides a further advantage not only with respect to protecting all of these components but also with respect to situating them at a single location where they can all be conveniently examined and serviced. Thus the housing 5 may be considered as a type of encapsulation of the electronic components providing the advantage that the required examination and repairs thereof can be carried out at a single part of the vehicle. Such operations can be carried out quickly and conveniently simply by displacing the seat means 3 in the manner described above upwardly away from its normal operating position to a suitable location such as that shown in FIG. 3.

There are known motorcycles of the above general type where it is conventional to situate a tool box beneath the seat. Such a seat is conventionally pivotally connected at its front end to the frame, this front end of the seat being situated next to the fuel tank. In order to remove a tool the seat is swung upwardly, but the extent of swinging is limited because the seat engages the fuel tank and thus cannot be turned upwardly through an angle sufficient to locate the seat at a position such as that shown in FIG. 3. This relatively small angle through which the seat means can be turned with a simple pivotal connection to the frame is indeed sufficient for removing a tool from beneath the seat, but the extent of turning provided by such conventional construction does not afford sufficient space to be able to carry out repairs on electronic switching elements or the like if such components were indeed situated beneath the seat means of a conventional motorcycle or the like.

Thus, the present invention avoids the drawbacks which would be encountered with conventional structures, inasmuch as with the structure of the invention the seat means is guided for longitudinal rearward movement while at the same time being turnable about a transverse axis. Thus, the pivot means formed by the pin 11 of the rollers 12 enables the seat means 3 to be turned while at the same time the rearward guiding of the pivot means enables the seat means to be situated rearwardly away from the fuel tank so that it can then be turned upwardly without limiting the extent of turning by the fuel tank. This greater extent of turning of the seat means afforded by way of the present invention renders it possible to achieve at the housing 5 a free space which is sufficient to give free access to the housing 5 and electrical components. Of course it is to be understood that the structure formed by the housing 5 and the components 20 could if desired be fixed to the seat means 3 in the recess 4 thereof rather than to the angle irons 13 of the frame means 1. The latter construction which is shown in the drawings and described above is preferred, however, because the support afforded by the angle irons 13 is of a greater rigidity than that which would be afforded by a mounting directly on the seat means 3 in the recess 4 thereof.

Of course, a further advantage of the structure of the invention resides in the fact that the fingers 14 extend downwardly through only a short distance beyond the upper surface of the angle irons 13 so that once the lock means 16 is unlocked the seat means 3 need only be turned upwardly through a relatively small angle in order to release the seat means 3 for rearward movement. At the same time, when the seat means 3 is in its normal operating position the lock means 16 will prevent undesired upward turning of the seat means 3.

Of course, the present invention also can be advantageously used in the case where components important to the operation of the vehicle but not necessarily electronic components are covered by the seat means.

What is claimed is:

1. In a power-driven land vehicle having a frame means, seat means situated over said frame means and adapted to be straddled by the operator of the vehicle, and a fuel tank carried by said frame means forwardly of said seat means with the latter having a front end situated adjacent said fuel tank when said seat means is in a normal operating position, the improvement wherein said seat means and frame means form a pair of means which define between themselves a space which, when said seat means is in said normal operating position, is enclosed and inaccessible, connecting means connecting said seat means to said frame means at the region of the front end of said seat means for movement from said normal operating position rearwardly away from said fuel tank and for turning movement about an axis transverse to the rearward movement to a location at least partially spaced from said frame means for giving access to said space, said connecting means including an elongaed guide means carried by said frame means and extending therealong rearwardly from the fuel tank beneath the seat means at the region of the front end thereof when said seat means is in said normal operating position, and pivot means connected to said seat means for supporting the latter for turning movement about said axis, said pivot means being guided by said guide means for movement both rearwardly away from said fuel tank when the seat means is displaced to said location and back toward the fuel tank when the seat means is returned to said normal operating position, releasable holding means connected to said seat means and engaging said frame means for releasably holding said seat means in said normal operating position, said releasable holding means including at least one projection fixed to one of said pair of means and engaging the other of said pair of means for preventing rearward movement of said seat means away from the fuel tank, and spring means urging said seat means rearwardly away from said fuel tank and maintaining said projection in engagement with the other of said pair of means until said seat means is turned about said axis for terminating the engagement between said projection and said other means and for then releasing said seat means to be displaced rearwardly by said spring means, and said vehicle including a structure comprising electronic components carried by at least one of said pair of means and situated in said space when said seat means is in said normal operating position thereof so that in the latter position of said seat means said structure is inaccessible and protected from the outer atmosphere, while upon displacement of said seat means to said location said structure is rendered accessible.

2. The combination of claim 1 and wherein said releasable holding means includes a releasable lock means for releasably locking said seat means to said frame means in the normal operating position of said seat means.

3. In a power-driven land vehicle having a frame means, seat means situated over said frame means and adapted to be straddled by the operator of the vehicle, and a fuel tank carried by said frame means forwardly of said seat means with the latter having a front end situated adjacent said fuel tank when said seat means is in a normal operating position, the improvement wherein said seat means and frame means form a pair of means which define between themselves a space which, when said seat means is in a normal operating position, is enclosed and accessible, connecting means connecting said seat means to said frame means at the region of the front end of said seat means for movement from said normal operating position rearwardly away from said fuel tank and for turning movement about an axis transverse to the rearward movement to a location at least partially spaced from said frame means for giving access to said space, said connecting means including an elongated guide means carried by said frame means and extending therealong rearwardly from the fuel tank beneath the seat means at the region of the front end thereof when said seat means is in said normal operating position, said guide means including an elongated tube having an upper wall formed with a slot, and pivot means connected to said seat means for supporting the latter for turning movement about said axis, said pivot means being guided by said guide means for movement both rearwardly away from said fuel tank when the seat means is displaced to said location and back toward the fuel tank when the seat means is returned to said normal operating position, said pivot means including a bar connected to said seat means and extending downwardly through said slot into said tube while being freely movable along said slot, and roller means carried by said bar in said tube for rolling along an inner lower surface thereof, said roller means having an axis forming the turning axis of said seat means, and said vehicle including a structure comprising electronic components carried by at least one of said pair of means and situated in said space when said seat means is in said normal operating position thereof so that in the latter position of said seat means said structure is inaccessible and protected from the outer atmosphere, while upon displacement of said seat means to said location said structure is rendered accessible.

4. In a land vehicle having a frame means and a seat means situated over said frame means and adapted to be straddled by the operator of the vehicle, and a fuel tank carried by said frame means forwardly of said seat means, the latter having a front end region situated adjacent said fuel tank when said seat means is in a normal operating position, the improvement wherein said seat means and frame means form a pair of means which define between themselves a space which, when said seat means is in said normal operating position, is substantially closed and substantially inaccessible, connecting means connecting said seat means to said frame means for movement with respect thereto from said normal operating position to a location at least partially spaced from said frame means for giving access to said space, said connecting means including an elongated guide means extending rearwardly from said fuel tank and beneath said seat means when the latter is in its normal operating position, and further including a pivot means connected to said seat means and guided by said guide means for movement rearwardly away from and forwardly toward said fuel tank while said pivot means provides for said seat means a turning axis transverse to the movement of said pivot means along said guide means, said seat means having at least one projection extending downwardly from said seat means and engaging a portion of said frame means to prevent rearward movement of said seat means, and a spring means urging said seat means rearwardly away from said fuel tank for maintaining said projection in engagement with said portion of said frame means until said seat means is partially turned about said axis toward said location so that said spring means then displaces said seat means rearwardly away from the fuel tank, said frame means having a surface along which said projection can slide during rearward movement of said seat means so that the engagement of said projection with said frame means will maintain the seat means displaced away from said normal operating position thereof during rearward movement of the seat means by said spring means and said vehicle including a structure carried by at least one of said pair of means and situated in said space when said seat means is in said normal operating position thereof so that in the latter position of said seat means said structure is inaccessible and protected from the outer atmosphere, while upon displacement of said seat means to said location said structure is rendered accessible.

* * * * *